United States Patent
Deladurantaye et al.

(10) Patent No.: US 8,798,107 B2
(45) Date of Patent: Aug. 5, 2014

(54) DEVICE AND METHOD FOR GENERATING BURSTS OF PICOSECOND OPTICAL SUB-PULSES

(75) Inventors: Pascal Deladurantaye, St-Joseph de la Pointe-Lévy (CA); Louis Desbiens, St-Augustin-de-Desmaures (CA); Vincent Roy, Québec (CA); Yves Taillon, St-Augustin-de-Desmaures (CA)

(73) Assignee: Institut National d'Optique, Quebec, Quebec (CA)

( * ) Notice: Subject to any disclaimer, the term of this patent is extended or adjusted under 35 U.S.C. 154(b) by 1213 days.

(21) Appl. No.: 12/624,324

(22) Filed: Nov. 23, 2009

(65) Prior Publication Data

US 2010/0135347 A1    Jun. 3, 2010

Related U.S. Application Data (63) Continuation-in-part of application No. 12/408,215, filed on Mar. 20, 2009, now Pat. No. 7,974,319.

(60) Provisional application No. 61/116,873, filed on Nov. 21, 2008.

(51) Int. Cl.
    *H01S 3/10* (2006.01)

(52) U.S. Cl.
    USPC .... 372/25; 372/626; 372/29.016; 372/29.023

(58) Field of Classification Search
    USPC .......................................... 372/25
    See application file for complete search history.

(56) References Cited

U.S. PATENT DOCUMENTS

| | | | |
|---|---|---|---|
| 4,560,246 A | 12/1985 | Cotter | |
| 5,200,964 A | 4/1993 | Huber | |
| 5,285,467 A * | 2/1994 | Scheps | 372/69 |
| 5,432,631 A | 7/1995 | Mamyshev | |
| 5,566,381 A | 10/1996 | Korotky | |

(Continued)

FOREIGN PATENT DOCUMENTS

| | | |
|---|---|---|
| EP | 1 674 901 A1 | 6/2006 |
| WO | WO 2007/118333 A1 | 10/2007 |
| WO | WO 2008/032021 A2 | 3/2008 |
| WO | WO 2008/086625 A1 | 7/2008 |

OTHER PUBLICATIONS

Forrester et al. "Effects of heat transfer and energy absorption in the ablation of biological tissues by pulsetrain-burst (>100 MHz) ultrafast laser processing." Photonics North 2006, Proc. of SPIE, vol. 6343, 63430J-1.

(Continued)

*Primary Examiner* — Xinning Niu
(74) *Attorney, Agent, or Firm* — Merchant & Gould P.C.

(57) ABSTRACT

A method and device are provided for generating bursts of sub-pulses, preferably in the picosecond range. Seed pulses are first generated, and then phase modulated to spread their spectral profile to several time-dependent spectral components. The phase modulated seed pulses are then spectrally filtered to remove spectral components and retain only selected ones, creating gaps in the amplitude profile of the seed pulses which therefore form bursts of sub-pulses. Various parameters such as the modulation amplitude, the modulation frequency, the spectral characteristics of the filters and the overall amplitude of the seed pulses may be controlled to provide a great versatility and adaptability.

30 Claims, 9 Drawing Sheets

(56) References Cited

U.S. PATENT DOCUMENTS

| | | | |
|---|---|---|---|
| 5,930,024 | A | 7/1999 | Atlas |
| 6,072,615 | A * | 6/2000 | Mamyshev ................ 398/185 |
| 6,108,465 | A | 8/2000 | Iida et al. |
| 6,151,338 | A | 11/2000 | Grubb et al. |
| 6,552,301 | B2 | 4/2003 | Herman et al. |
| 6,587,623 | B1 | 7/2003 | Papen et al. |
| 6,778,565 | B2 | 8/2004 | Spuehler et al. |
| 6,813,448 | B1 | 11/2004 | Chiappetta |
| 6,856,640 | B2 | 2/2005 | Henrich et al. |
| 7,103,285 | B1 | 9/2006 | Okuno |
| 7,349,637 | B1 | 3/2008 | Frederiksen, Jr. et al. |
| 7,428,253 | B2 | 9/2008 | Murison et al. |
| 2006/0018349 | A1 | 1/2006 | Kopf et al. |
| 2006/0159138 | A1 | 7/2006 | Deladurantaye et al. |
| 2006/0245456 | A1 | 11/2006 | Lasri et al. |
| 2007/0196048 | A1 | 8/2007 | Galvanauskas et al. |
| 2009/0323741 | A1 | 12/2009 | Deladurantaye et al. |
| 2010/0128744 | A1 | 5/2010 | Deladurantaye et al. |

OTHER PUBLICATIONS

Jiang et al. "Optical Processing Based on Spectral Line-by-Line Pulse Shaping on a Phase-Modulated CW Laser." IEEE Journal of Quantum Electronics, vol. 42, No. 7, Jul. 2006, pp. 657-666.

Mamyshev "Dual-wavelength source of high-repetition-rate, transform-limited optical pulses for soliton transmission." Optics Letters, vol. 19, No. 24, Dec. 15, 1994, pp. 2074-2076.

Nebel et al. "Generation of tailored picosecond-pulse-trains for micro-machining" Photonics West 2006, LASE Conference: Commercial and biomedical Applications of Ultrafast Lasers VI, Paper No. 6108-37 1/8.

Yamada et al. "Application of planar lightwave circuit platform to hybrid integrated optical WDM transmitter/receiver module." IEEE Electronics Letters Online, 19950941 (1995).

Jiang, Z. et al. "Optical arbitrary waveform processing of more than 100 spectral comb lines", Nature Photonics, vol. 1, Aug. 2007, pp. 463-467.

Golovchenko, E. et al. "Analysis of optical pulse train generation through filtering of an externally phase-modulated signal from a CW laser", Electronics Letters, vol. 31, No. 16, Aug. 1995, pp. 1364-1366.

International Preliminary Report on Patentability for International Patent Application Serial No. PCT/CA2009/000365 dated Nov. 15, 2010.

International Search Report for International Patent Application Serial No. PCT/CA2009/000365 mailed Aug. 19, 2009.

Agrawal, G. "Nonlinear Fiber Optics", Academic Press, San Diego, 2001. Chapter 9, pp. 370-403.

Boyd, R. W. "Nonlinear Optics", $3^{rd}$Edition, Academic Press, 2008, Section 9.3.3, pp. 447-448.

Boggio et al. "8 dB increase of the SBS threshold in an optical fiber by applying a stair ramp strain distribution", Conference on Lasers and electro-Optics/International Quantum Electronics Conference and Photonic Applications Systems Technologies, Technical Digest (CD) Optical Society of America, 2004, paper CThT30.

Cotter et al. "Stimulated Brillouin Scattering in Monomode Optical Fiber", Journal of Optical Communications, vol. 4, Issue 1, 1983, pp. 10-19.

Hansryd et al. "Increase of the SBS Threshold in a Short Highly Nonlinear Fiber by Applying a Temperature Distribution", Journal of Lightwave Technology, vol. 19, No. 11, Nov. 2001, pp. 1691-1697.

* cited by examiner

DEVICE AND METHOD FOR GENERATING BURSTS OF PICOSECOND OPTICAL SUB-PULSES

This application is a Continuation-in-Part of Ser. No. 12/408,215, filed Mar. 20, 2009 in the U.S., which claims benefit of Ser. No. 61/116,873, filed Nov. 21, 2008 in the U.S. and which applications are incorporated herein by reference. To the extent appropriate, a claim of priority is made to each of the above disclosed applications.

FIELD OF THE INVENTION

The present invention generally relates to pulsed lasers and more particularly concerns a method and a laser device which generates nanosecond bursts of sub-pulses in the picosecond range.

BACKGROUND

High power pulsed fiber lasers are currently in demand for a number of applications and uses. For example, numerous material processing applications such as memory repair, milling, micro-fabrication, drilling, etc. require pulsed laser systems which provide, among others, the four following characteristics all at the same time and with a great stability under different operating conditions and over time:

- High pulse energy (50 µJ or higher) with excellent pulse amplitude stability, for processing material at the laser operating wavelength or for efficient frequency conversion;
- Excellent beam quality ($M^2<1.1$, astigmatism<10%, beam roundness>95%) with robust single mode operation, for superior processing quality, high throughput processes and efficient frequency conversion;
- Narrow linewidth ($\Delta\lambda<0.5$ nm), for small spot sizes and efficient frequency conversion; and
- Great flexibility in terms of control of the pulse temporal profile, such as pulse to pulse control over the temporal profile at high (>100 kHz) repetition rates.

In other applications such as remote sensing of different chemical species, the source must additionally provide some level of flexibility over the pulse spectrum.

The advantages of laser materials processing with picosecond laser pulses are increasingly gaining attention in the industry. The time scale involved in such processes combines the benefits of light-matter interaction dynamics at both femtosecond and nanosecond regimes. For instance, laser light intensity on a work surface may be increased above the cold ablation threshold (even for high band gap materials), provided that the light pulses have sufficient energy for a given pulse duration (e.g. 10-100 µJ for a pulse duration of a few tens of picoseconds). A limited heat-affected zone on the processed material and little or no collateral damage is typically obtained from cold ablation performed with femtosecond optical pulses. However, femtosecond lasers are often complex and expensive. In addition, the ablation process is inherently slow, since the layer which is removed is usually very thin compared to that obtained using thermal ablation with nanosecond pulses. Finally, cold ablation may results in catastrophic damages when machining brittle materials.

Trains of picosecond laser pulses emitted at high repetition rates (>100 MHz) in a burst regime combine the benefits of both cold ablation and thermal ablation processes (see for example P. Forrester et al., "*Effects of heat transfer and energy absorption in the ablation of biological tissues by pulse train-burst (>100 MHz) ultrafast laser processing*", Proc. of SPIE Vol. 6343, 63430J (2006); A. Nebel, et al., "*Generation of tailored picosecond-pulse-trains for micromachining*", Proc. of SPIE Vol. 6108, 6108-37 (2006); and U.S. Pat. No. 6,552,301, issued Apr. 22, 2003 to HERMAN et al.). Under such conditions, the time interval between successive pulses is short enough for heat to accumulate at the work surface, thus conditioning the material for subsequent ablation by multiphoton ionization with high laser beam intensities. Burst duration and pulse repetition rate provide unique control over the fluence delivery at the target. In turn, the latter is strongly tied to the processing speed and process quality. In effect, the pulse train burst characteristics allow the physical processes that depend on ultrashort laser pulses to be addressed separately from the characteristics of longer-time heat diffusion. This ensures clean ablation with smooth features.

Suitable bursts of picosecond pulses are generally obtained through a mode-locked is laser producing a picosecond pulse train combined with a slicer or pulse picker, which selects the pulses which constitute the "burst". Actively mode-locked fiber lasers allow for the generation of picosecond pulses at high repetition rates, such as for example shown in U.S. Pat. No. 6,108,465 (LIDA et al.) and U.S. patent application published under no. 2006/0245456 A1(LASRI et al.). However, the timing between successive pulses cannot be adjusted arbitrarily; it is rather determined by the harmonics of the laser cavity and the fundamental pulse repetition frequency. Additionally, adjustable pulse durations of a few tens of picoseconds are difficult to obtain, since complex pulse shaping mechanisms occur along the pulse propagation within the fiber laser cavity. Semiconductor laser diodes may also be used for generation of picosecond pulses, either through active/passive mode-locking or through gain switching. However, both techniques suffer from serious drawbacks. For instance, pulse repetition rates below 10 GHz are hardly possible with electrically-pumped, mode-locked semiconductor laser diodes unless the device is inserted in an external cavity, while pulse shape and duration are barely adjustable in gain-switched semiconductor laser diodes. In either case, the energy of the emitted pulses is rarely above a few picoJoules.

Although other schemes are known for generating trains of picosecond pulses with relatively high repetition rates, they are not adapted to the generation of pulse train bursts, nor do they provide the flexibility and adaptability often useful for micromachining applications or the like. For example, U.S. Pat. Nos. 5,432,631 and 6,072,615, both to MAMYSHEV, teach of externally phase-modulated signals from cw lasers generating picosecond pulse trains for use in high data rate transmitters in optical fiber communications. See also P. V. Mamyshev et al., "*Dual-wavelength source of high-repetition-rate, transform-limited optical pulses for soliton transmission*", Opt. Lett. 19(24), pp. 2074-2076 (1994), and E. A. Golovchenko et al., "*Analysis of optical pulse train generation through filtering of an externally phase-modulated signal from a CW laser*", Electron. Lett. 31(16), pp. 1364-1366 (1995). The schemes discussed in these references fall short of energy (or fluence) since they do not address the specifics of pulsed fiber laser systems developed and used for light-matter interaction processes (e.g. material processing). In Z. Jiang, et al., "*Optical processing based on spectral line-by-line pulse shaping on a phase-modulated CW laser*", IEEE J. Quantum Electron. 42(7), pp. 657-666 (2006), a similar approach is disclosed in the context of optical processing, but the line-by-line pulse shaper therein involves free space light propagation as well as the use of liquid crystal modulator, resulting in a system which may be too complex or costly for typical micromachining applications.

Solid-state gain media may also be used for high repetition rate ultrashort (e.g. picosecond) pulse lasers (see for example U.S. Pat. No. 6,778,565 (SPUEHLER et al.) U.S. Pat. No. 6,856,640 (HENRICH et al.)). Despite some prior art regarding tailoring of pulse train sequences emitted from such systems (see U.S. patent application published under no 2006/0018349 (KOPF et al.)), most schemes relying on solid-state lasers suffer from the same drawbacks as the methods mentioned above, i.e. fine tuning of both pulse repetition rate and pulse duration is virtually impossible. In addition, solid-state lasers lack the near diffraction-limited beam quality that sets apart fiber lasers and amplifiers from other types of laser sources.

There remains a need in the art for reliable, efficient and versatile tailoring methods and systems specifically dedicated to the generation of pulse train bursts of picosecond optical pulses, particularly for industrial applications purposes in material micro-machining.

SUMMARY OF THE INVENTION

In accordance with a first aspect of the present invention, there is provided a method for generating bursts of optical sub-pulses, comprising:
  a. generating seed optical pulses each having a pulse duration, an amplitude profile and a spectral profile;
  b. imposing a periodic phase modulation on said seed pulses, said periodic phase modulation having a modulation frequency and a modulation amplitude jointly selected to spread the spectral profile of each of said seed pulses over a plurality of time-dependent spectral components; and
  c. spectrally filtering each of said seed pulses to retain therein only selected ones of said time-dependent spectral components, said filtering creating gaps in the amplitude profile of the seed pulses, said seed pulses thereby defining said bursts of sub-pulses.

In accordance with another aspect of the invention, there is also provided a device for generating bursts of optical sub-pulses, comprising:
  a light generating assembly generating seed optical pulses each having a pulse duration, an amplitude profile and a spectral profile;
  a phase modulator imposing a periodic phase modulation on said seed pulses, said periodic phase modulation having a modulation frequency and a modulation amplitude jointly selected to spread the spectral profile of each of said seed pulses over a plurality of time-dependent spectral components; and
  a spectral filtering assembly spectrally filtering each of said seed pulses to retain therein only selected ones of said time-dependent spectral components, said filtering creating gaps in the amplitude profile of the seed pulses, said seed pulses thereby defining said bursts of sub-pulses.

Embodiment of the invention may provide efficient and versatile temporal and spectral tailoring methods specifically adapted and optimized for the generation of electromagnetic radiation in the form of picosecond optical pulse train bursts, with individual pulse duration between a few tens and a few hundreds of picoseconds, time period between successive pulses within a burst of a few hundred picoseconds to a few nanoseconds, burst duration between a few nanoseconds and a few hundred nanoseconds and burst repetition rate approximately 100 kHz to 1 MHz.

Other features and advantages of the present invention will be better understood upon reading of preferred embodiments thereof, with reference to the appended drawings.

DESCRIPTION OF PREFERRED EMBODIMENTS

Embodiments of the present invention generally provide methods and devices for generating bursts of optical sub-pulses.

Figure 1:
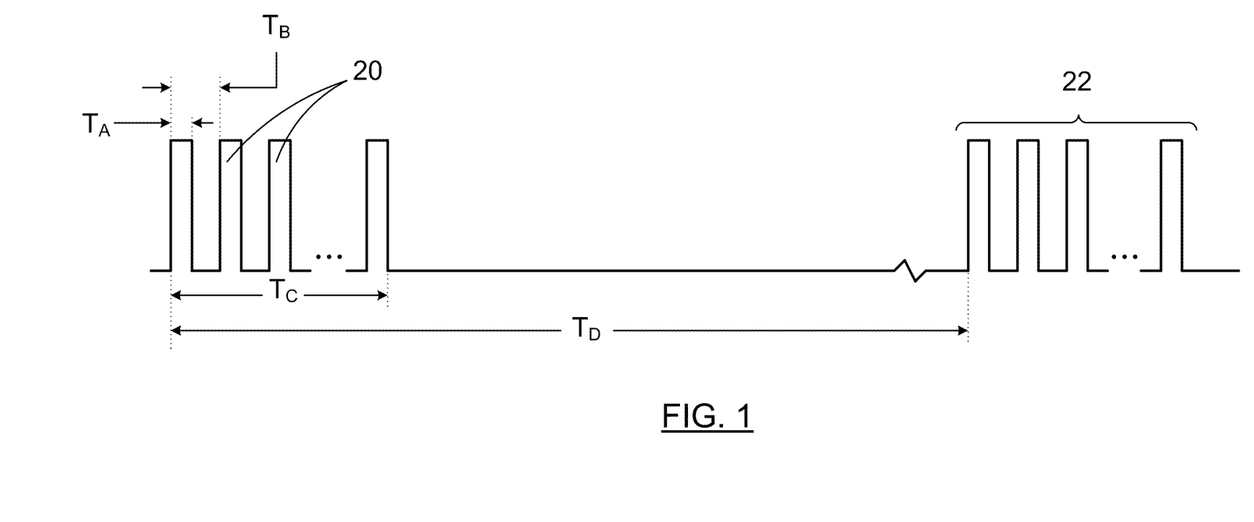
FIG. 1 is a schematized representation of successive bursts of sub-pulses.

The expression "optical pulses" is understood herein to refer to the discrete onset of electromagnetic radiation separated by an interpulse period where light is absent or negligible. A periodic series of pulses is often referred to as a pulse train. A "burst" of sub-pulses is understood to refer to a series of consecutive pulses (referred to in this context as "sub-pulses") separated from previous and subsequent pulses by a long period of time compared to the time scale of the sub-pulses. The various time parameters characterizing optical pulses are best understood with respect to FIG. 1. $T_A$ designates the duration of one sub-pulse 20, $T_B$ the period of the pulse train, $T_C$ the burst duration, and $T_D$ the period of the bursts 22.

The terms "light" and "optical" are used herein to refer to electromagnetic radiation of any appropriate wavelength. While the described embodiments are particularly directed to the infrared (IR) and near infrared (NIR) regime, this aspect is in no way considered limitative to the scope of the invention.

Embodiments of the present invention are particularly useful for micromachining applications where the time parameters can be adapted to provide a sub-pulse duration of about 10 to 100 ps, a pulse period between 0.1-1 ns, a burst duration of about 1-100 ns and a burst period between about 1-10 μs. However, embodiments of the invention are not limited to such applications and can also be adapted for other high power applications such as memory repair, milling, microfabrication, drilling and other material processing applications, as well as remote sensing or any other application which may benefit from high power pulses having good optical characteristics.

Device for Generating Bursts of Sub-Pulses

Figure 2A:
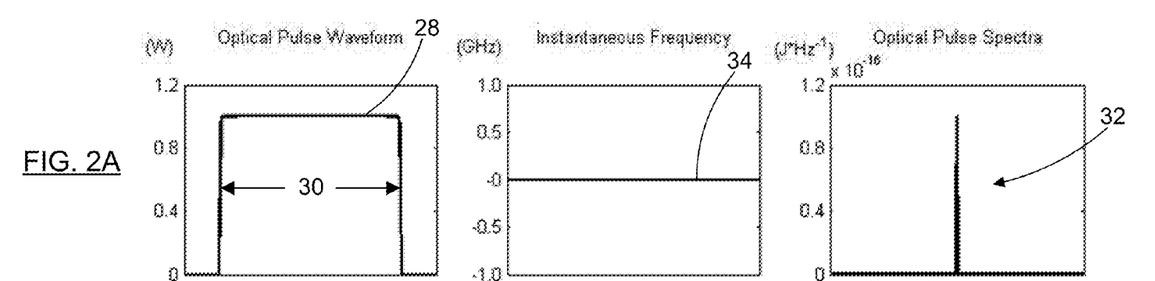
FIG. 2A is a set of three (3) graphs illustrating the amplitude profile, instantaneous frequency and spectral profile of a seed pulse.
Figure 3:
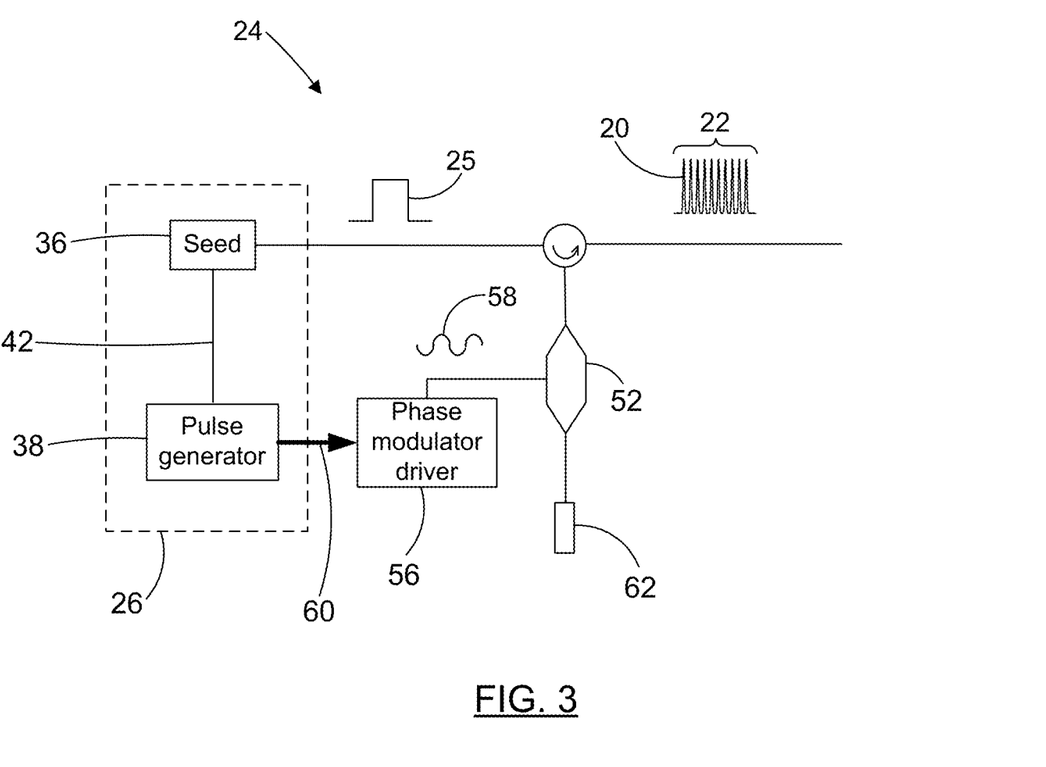
FIG. 3 is a schematic representation of a device to generate bursts of optical sub-pulses according to an embodiment of the invention.

Referring to FIG. 3, there is shown a first example of a device 24 according to an embodiment of the present invention. The device first includes a light generating assembly 26 generating seed optical pulses 25. Each seed pulse 25 is characterised by a pulse duration, an amplitude profile and a spectral profile. An example of the optical characteristics of a seed pulse are shown in FIG. 2A. The left-most graph shows the square-shaped amplitude profile 28 of the seed pulse, whose width defines the seed pulse duration 30. In this example, the spectral profile 32 is shown on the right-most graph as centered on a seed frequency 34, which is generally constant over time (see middle graph). One skilled in the art will understand that in practice, the frequency of a light pulse may exhibit a small drift over time (or chirp) on the scale of the pulse duration, but that this drift is in general considered negligible with respect to the modifications imposed on the spectrum by the present invention, as will be apparent below. The seed pulses are outputted at a given repetition rate.

In preferred embodiments, the seed pulse duration is typically a few nanoseconds to a few hundred nanoseconds, whereas the repetition rate is in the range of 100 kHz to 1 MHz. The seed frequency for micromachining embodiments is preferably in the IR or NIR spectrum.

Referring still to FIG. 3, in one embodiment, the light generating assembly includes a seed assembly 36 outputting the optical pulses 25, and a pulse generator 38 cooperating with said seed assembly 36 to control the amplitude profile, pulse duration and repetition rate of the seed pulses. In some embodiments (see for example FIG. 4), the seed assembly 36 may be embodied by a pulsed seed source 40, which is electrically driven by the pulse generator 38. The pulse seed source 40 may be a semiconductor laser diode of any appropriate configuration such as a Fabry-Perot cavity, a distributed-feedback diode, an external-cavity diode laser (ECDL), etc. The semiconductor diode may be fiber-based and may guide light in a single mode, either in a transverse or longitudinal regime. The pulse generator 38 may, for example, be embodied by a device or platform apt to generate a pulse drive signal 42 of appropriate characteristics, and is preferably based on high speed electronics. The drive signal 42 is preferably tailored to vary the drive current of the pulsed seed source 40 in order for the optical pulses 25 generated thereby to have the desired amplitude profile. One skilled in the art will readily understand that the optical characteristics of the optical pulses 25 will depend on a number of factors, such as the complex impedance of the pulsed seed source 40, which is itself dependent on the physics of the cavity of this source and on the diode package.

Figure 5:
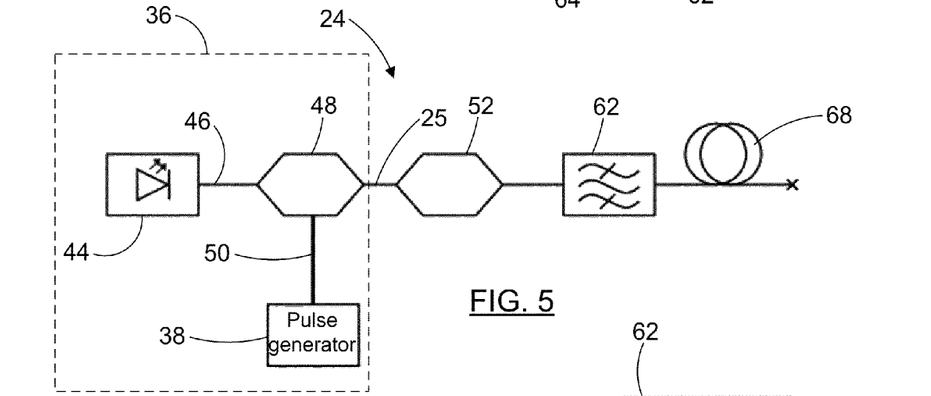
FIG. 5 is a schematic representation of another alternative configuration of a device to generate bursts of optical sub-pulses according to an embodiment of the invention.
Figure 6:
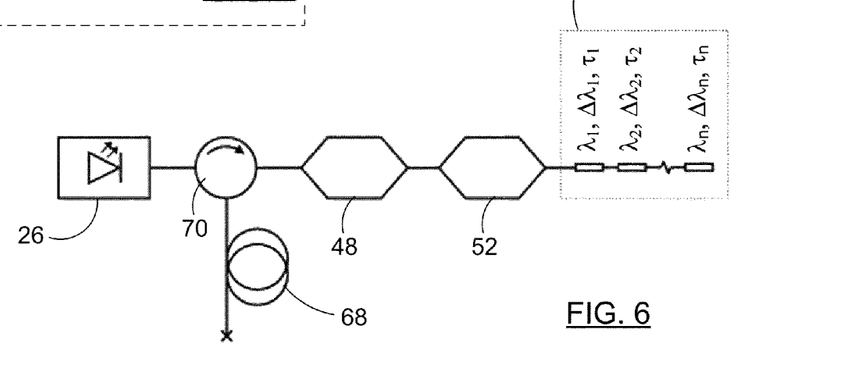
FIG. 6 is a schematic representation of another alternative configuration of a device to generate bursts of optical sub-pulses according to an embodiment of the invention.
Figure 7A:
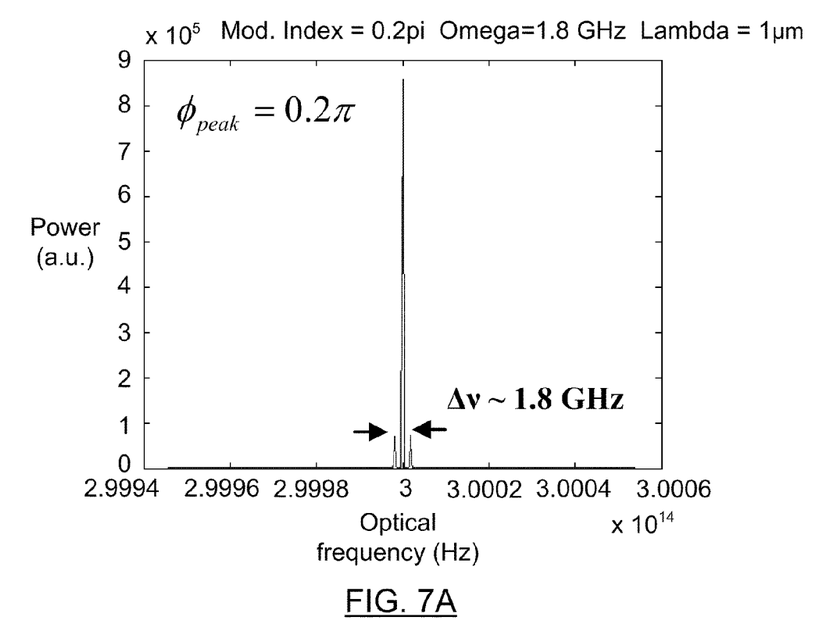
FIGS. 7A to 7D are graphs illustrating the spread of the spectral profile of a phase modulated seed pulse for increasing modulation amplitudes.
Figure 7B:
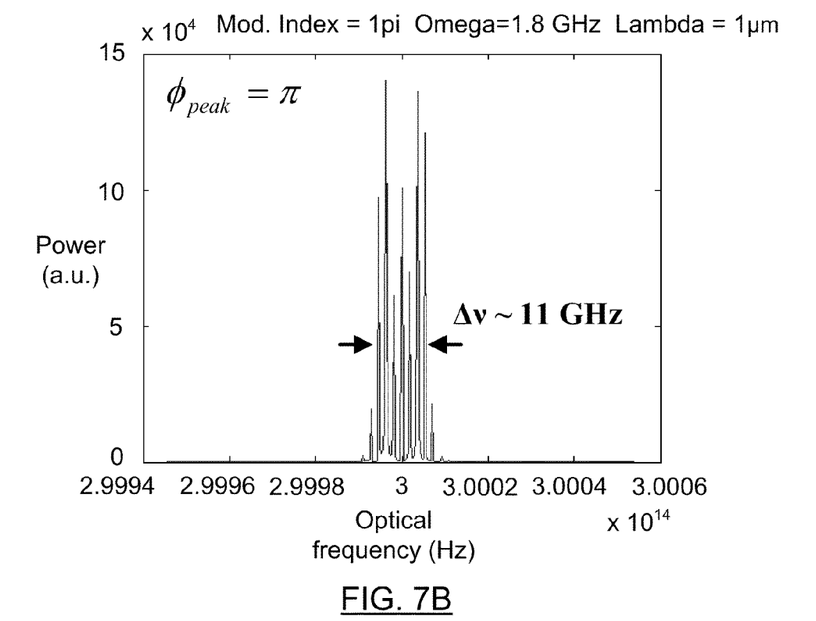
Figure 7C:
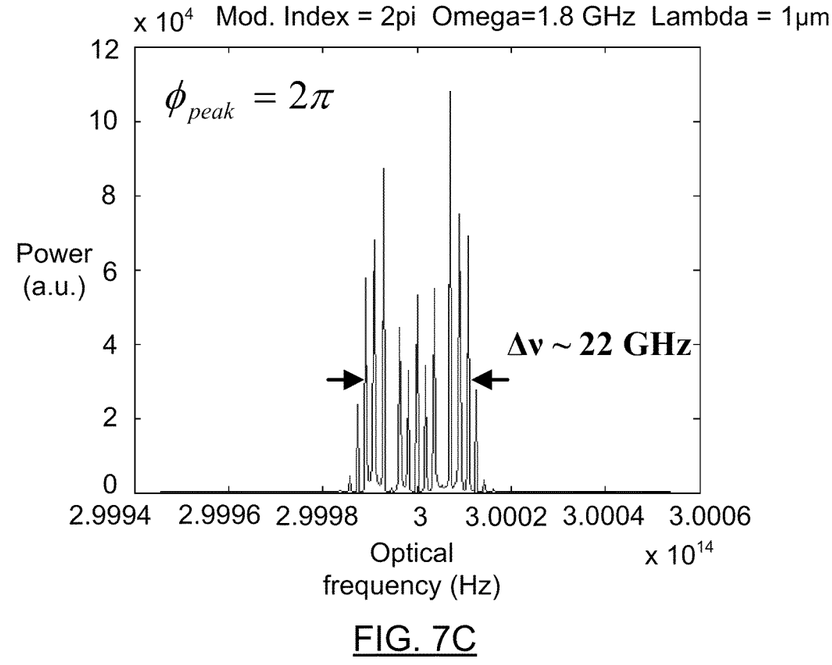
Figure 7D:
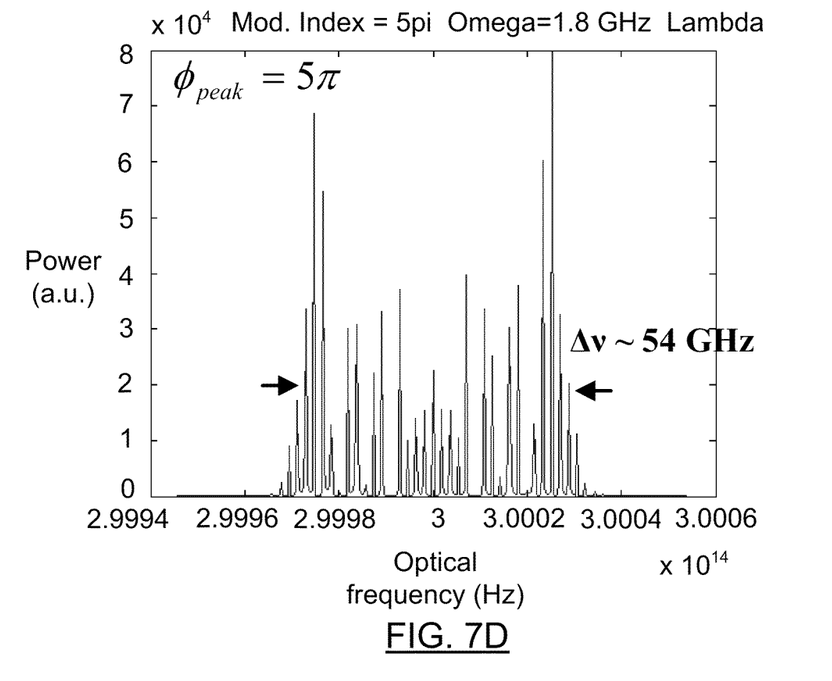

FIGS. 5 and 6 show alternative embodiments where the seed assembly 36 includes a continuous wave (cw) seed light source 44 generating a continuous light beam 46, followed by at least one amplitude modulator 48 modulating the continuous light beam 46 to provide the optical pulses 25. In such embodiments, the pulse generator 38 sends a modulation drive signal 50 to each amplitude modulator 48. Each modulation drive signal 50 controls the opening of the corresponding amplitude modulator 48 to allow light therethrough according to the desired output shape of the optical pulses 25 formed in this manner. The light may traverse the amplitude modulator 48 in two or more passes, as exemplified in FIG. 6. In a preferred embodiment, a pair of amplitude modulators (not shown) are provided, each controlled by an appropriate modulation drive signal, and are opened in complete or partial synchronization with the arrival of the optical pulses thereat, providing a greater resolution and versatility in the characteristics of the resulting pulses. Such configurations are described in more detail in U.S. patent application US-2006-0159138-A1 (DELADURANTAYE et al.), the contents of which are incorporated herein by reference, in their entirety. In such embodiments, the pair of amplitude modulators may be disposed in various configurations, as will be readily understood by one skilled in the art. In other embodiments, one or more amplitude modulators may be used to modify optical pulses from a pulsed seed light source.

It will be noted that either type of seed source, whether pulsed 40 or continuous 44, may be tunable in wavelength, according to techniques known in the art. Furthermore, one skilled in the art will readily understand that the light generating assemblies illustrated and described herein are given by way of example only, and that an almost infinite number of configurations could be used to generate the seed optical pulses without departing from the scope of the present invention.

Figure 4:
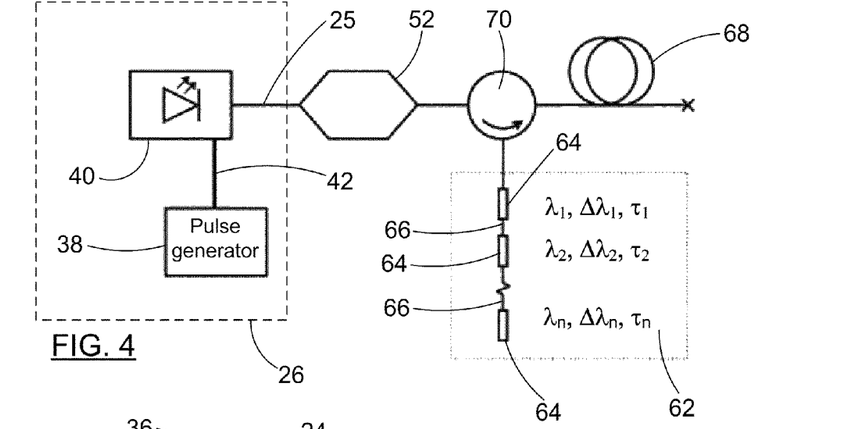
FIG. 4 is a schematic representation of an alternative configuration of a device to generate bursts of optical sub-pulses according to an embodiment of the invention.

Referring again to FIG. 3 and further to FIGS. 4 to 6, the device 24 according to embodiments of the invention further includes a phase modulator 52 which imposes a periodic phase modulation on the seed pulses 25 thereat. The periodic phase modulation has a modulation frequency and a modulation amplitude which are jointly selected so that the net effect of the phase modulation on the spectral profile of the seed pulses is to spread this spectral profile over a plurality of time-dependent spectral components.

Enforcing a rapid modulation, for example in the range of a few tenths to a few tens of GHz, on the phase of the seed pulses causes rapid and periodic variations of their instantaneous frequency, in the time domain, while in the frequency domain the spectral profile is broadened through harmonic sideband generation. While the phase modulation periodicity may be chosen arbitrarily, a sinusoidal phase modulation, with a modulation frequency $\Omega$ and modulation amplitude $\Delta\pi$ radians, is chosen for illustrative purposes in the numerical examples referenced herein. One skilled in the art will understand that other periodic modulations may be selected without departing from the scope of the present invention.

The effect of a sinusoidal modulation of frequency $\Omega$ can be understood as follows. The spectral profile of each seed pulse prior to the phase modulator, as shown in the right-most graph of FIG. 2A, is characterized by a seed frequency $\nu$ with a linewidth $\Delta\nu$. In general, the electric field time dependence of the optical pulses, with slowly time-varying amplitude A(t), is given by:

$$E(t)=A(t)\cdot\sin(2\pi\nu t+\phi(t)) \qquad (1)$$

where $\phi(t)$ is the time-dependent phase term that varies when applying the phase modulation. In the current example, this term obeys the modulation function:

$$\phi(t)=\phi_{peak}\sin(2\pi\Omega t+\phi_0) \qquad (2)$$

where $\phi_0$ is the initial phase and $\phi_{peak}$ the peak phase modulation amplitude. The peak phase deviation obtained when applying a peak voltage $V_{peak}$ on the phase modulator is given by:

$$\phi_{peak} = \pi \times \frac{V_{peak}}{V_\pi} \qquad (3)$$

where $V_\pi$ is a characteristic of the phase modulator. The Fourier decomposition of E(t) with $\phi(t)$ given by equation (2)

is a well known result of applied mathematics (see for example Bruce Carlson, "Communication Systems—An Introduction to Signals and Noise in Electrical Communication", McGraw-Hill, New York, 1986, chapter 7). In principle, under adequate modulation conditions, an infinite number of sideband lines at optical frequencies $v \pm n\Omega$, where n is an integer, appear in the spectral profile of the optical pulses. The spectral power density associated with a side band of index n is dependent upon the value of $\phi_{peak}$. In general, for $n > \phi_{peak}$, the spectral power density decreases rapidly as n increases. Typical spectral profiles of the optical pulses after tailoring are shown in FIGS. 7A to 7D, for various values of $\phi_{peak}$ and a same value of $\Omega$. It can be easily understood that by simply choosing appropriate values for both parameters of the phase modulation, the modulation frequency $\Omega$ and modulation amplitude $\phi_{peak}$, broadening of the spectral profile of the seed pulses is readily achieved. Preferably, the modulation frequency has a value between 100 MHz and 10 GHz, and the modulation amplitude is greater than $\pi$ radians.

Figure 2B:
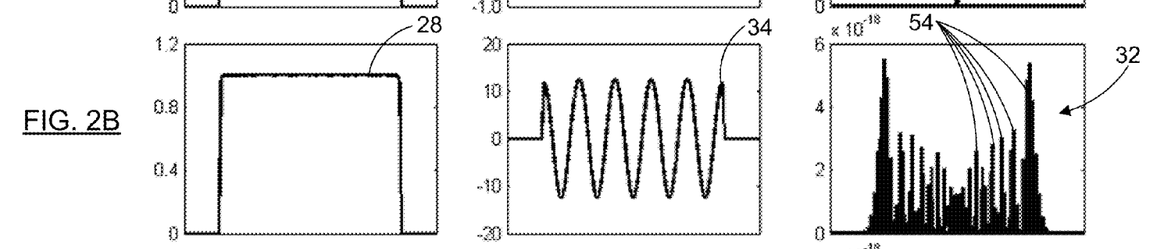
FIGS. 2B and 2C show similar graphs for a phase modulated seed pulse and the resulting burst of sub-pulses, respectively.

Referring to FIG. 2B, the optical characteristics of the seed pulses after imposition of a sinusoidal phase modulation are shown. Imposing a sinusoidal phase modulation on the seed pulses will result in an oscillation of the instantaneous frequency 34 over the pulse duration, as best seen in the middle graph of FIG. 2B. The spread of the spectra is apparent on the right-most graph; instead of being quasi-monochromatic as before, the spectral profile 32 now includes a plurality of lines, symmetrically distributed on either side of the seed frequency. Each such line defines a spectral component 54. As will be understood from the middle graph of FIG. 2B, each spectral component 54 will only be present in the phase modulated seed pulse periodically at several discrete times over the pulse duration. It will be further observed from the left-most graph of FIG. 2B that the amplitude profile 28 of the seed pulse is not modified by the phase modulation, as light is not lost, only rearranged spectrally (except for the insertion loss of the phase modulator, which is not accounted for in this specific example).

Referring to FIG. 3, the phase modulator 52 may be embodied by an electro-optical component based modulator such as that well known in the art. The electro-optical material included in the phase modulator can be $LiNbO_3$, $LiTaO_3$, $KNbO_3$ or any other appropriate nonlinear material. Alternatively, the phase modulator 52 may be based on an acousto-optical component such as an acousto-optic modulator. In some embodiments, the device 24 may include more than one phase modulator 52 in a cascade, each applying a phase variation to the seed pulses 25 therethrough so that their combined effect on the phase of the seed pulses 25 results in the desired time-dependent spectral components. Alternatively or additionally, the device 24 may be configured so that the seed pulses 25 make more than one pass through one or more phase modulator 52.

Preferably, a phase modulator driver 56 providing a phase modulation drive signal 58 to the phase modulator 52, drives the activation of the phase modulator 52 according to the periodic phase modulation. As one skilled in the art will readily understand, appropriate control of the phase modulation driver 56 allows one to control the characteristics of the periodic phase modulation, such as the modulation function, modulation frequency and/or modulation amplitude. Optionally, the device 24 includes means for synchronizing the activation of the phase modulator 52 with the arrival of the seed pulses 25 thereat. This synchronization advantageously allows the use of low average power RF amplifiers to drive the phase modulator 52 and limits the thermal stress on the phase modulator 52, which is beneficial in terms of system cost, complexity and reliability. The synchronizing means are conceptually represented by the arrow 60 extending between the pulse generator 38 and the phase modulator driver 56, and one skilled in the art will understand that any combination of components and signals allowing the control of the timing of the activation of the phase modulator 52 in relation to the propagation of the optical pulses 25 therethrough could be used without departing from the scope of the present invention.

Downstream of the phase modulator 52, the device 24 further includes a spectral filtering assembly 62 spectrally filtering each of the modulated seed pulses, to retain therein only selected time-dependent spectral components. Such filtering creates gaps in the amplitude profile of the modulated seed pulses, since there is now an absence of light at the moments when the light energy has been spread to the removed frequencies, and the remaining light therefore takes the shape of discrete sub-pulses. Each seed pulse thereby becomes a burst of sub-pulses.

Figure 2C:
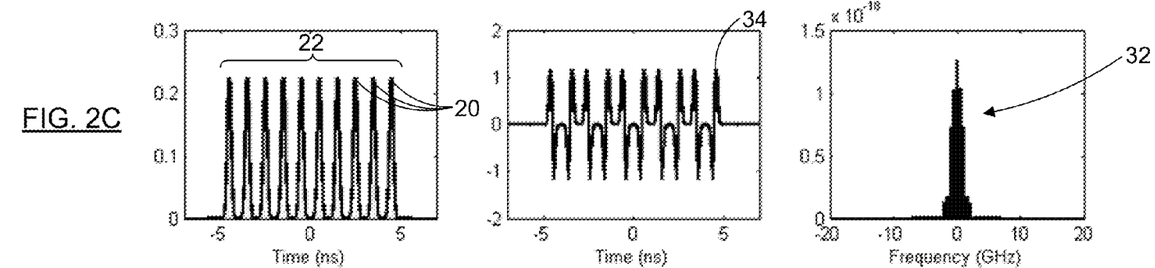

Preferably, the selected time-dependent spectral components are centered on the seed frequency, as best seen in FIG. 2C. On the right-most graph, the resulting spectral profile 32 is seen as a broad peak around the seed frequency. Comparing the center graphs of FIGS. 2B and 2C, it can be seen that the instantaneous frequency now drops to zero at the times when the maximum deviations could previously be found. The resulting amplitude profile, shown in the left-most graph, therefore takes the shape of a plurality of sub-pulses 20, grouped in a burst 22.

Referring to FIGS. 3 to 6, the spectral filtering assembly 62 may be embodied by any appropriate spectrally discriminating element or combinations thereof. The filtering assembly 62 may, for example, include one or more fiber Bragg gratings 64 each reflecting one or more of the selected time-dependent spectral components. Bragg gratings having a bandwidth typically of a few GHz to several tens of GHz are readily available and could be used for this purpose. In alternative embodiments, other filters such as interference filters or Fabry-Perot filters or the like may be used. In different variants, the filters may be used in transmission or reflection.

Referring particularly to FIGS. 4 and 6, in the case where the selected spectral components are centered on more than one frequency, the timing between distinct pulse train bursts may then become an issue, depending on the intended applications. This issue may be addressed by adjusting the timing between sub-pulse bursts emitted at distinct frequencies. Preferably, one or more delay lines 66 are provided for this purpose, each delay line 66 being disposed between consecutive Bragg gratings 64 that are themselves disposed in a series.

Figure 8:
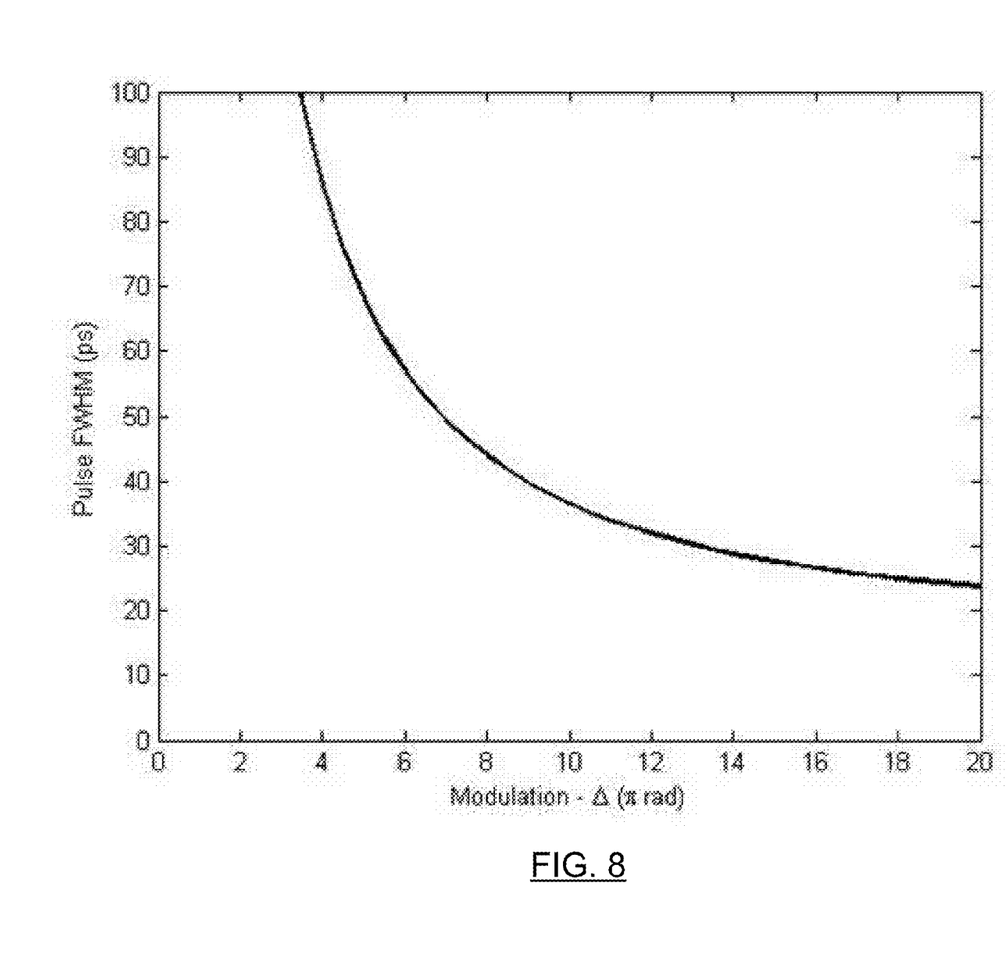
FIG. 8 is a graph illustrating the variation of the sub-pulse duration as a function of the modulation amplitude.

For micro-machining applications, the embodiments described above may be used to generate sub-pulses of sub-pulse duration between a few tens to a few hundred picoseconds, approximately. The sub-pulse duration depends on the bandwidth of the spectrally discriminating element as well as on the amplitude and frequency of the phase modulation. For example, FIG. 8 illustrates the relationship between the sub-pulse duration (FWHM) of picosecond sub-pulses in a burst based on a sinusoidal phase modulation, as a function of the phase modulation amplitude $\Delta\pi$ radians, assuming an optical filter bandwidth of about 0.1 nm and a modulation frequency of 2 GHz.

Preferably, the device may allow the control of all three parameters above, namely the bandwidth of the spectrally discriminating element, the modulation frequency and the modulation amplitude. As mentioned above, the modulation amplitude and frequency may for example be controlled through the phase modulator driver. Control of the filter bandwidth may for example be possible through the use of tunable Bragg gratings or the like. Controlling one, two, or all three of these parameters allows one skilled in the art to tune the sub-pulse duration and time interval between successive sub-pulses in a straightforward manner.

In the numerical examples referenced herein, the filters of the spectral filtering assembly are assumed to have a Gaussian-like dispersionless transmission function with a center frequency tuned to the average instantaneous frequency of the phase-modulated seed pulses. However, one skilled in the art will recognize without difficulty that other bandpass filter transfer functions can be contemplated without departing from the scope of the invention. For instance, dispersion arising from specific bandpass transmission profiles may help in shortening the duration of picosecond sub-pulses. Thus, the embodiments discussed herein may further comprise means to change the transmission function of the spectral filters in order to improve control over the properties of the picosecond sub-pulse bursts.

Figure 9A:
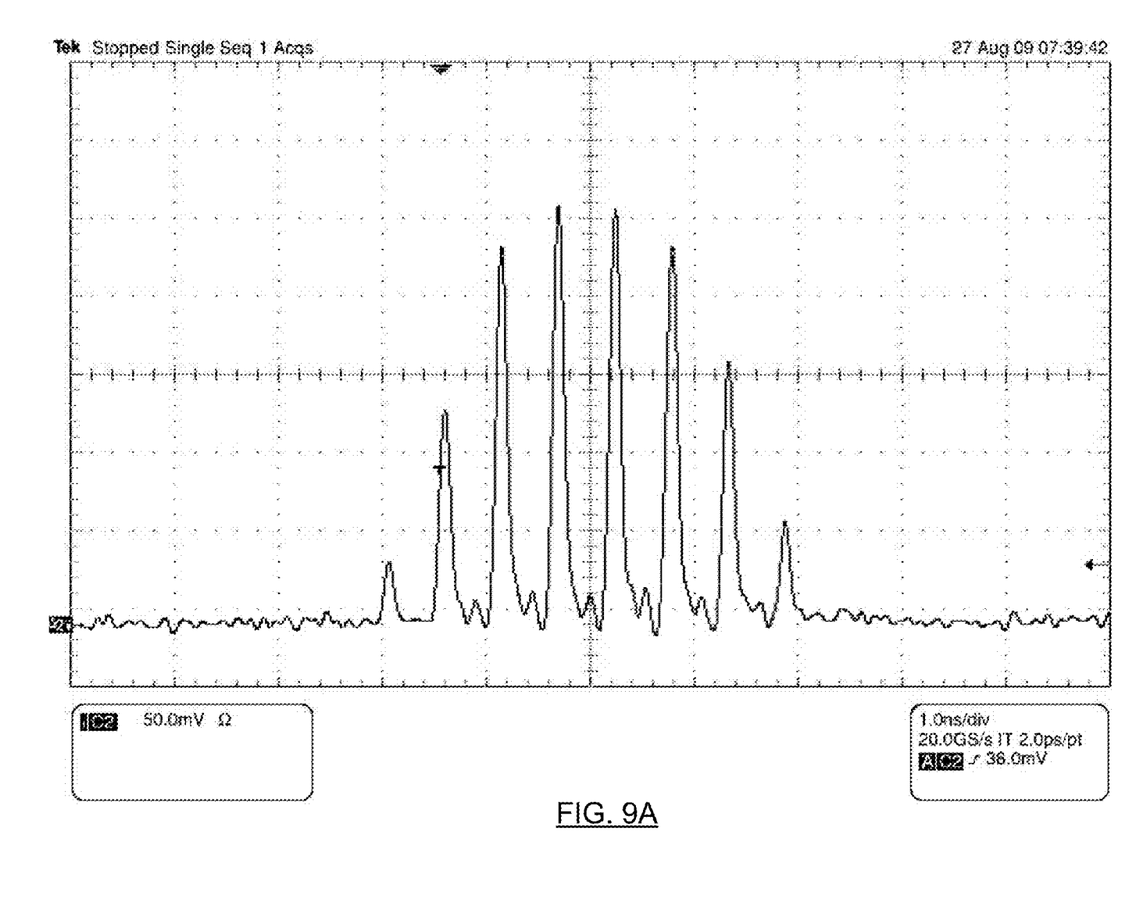
FIGS. 9A and 9B illustrate bursts of sub-pulses of various envelope shapes.
Figure 9B:
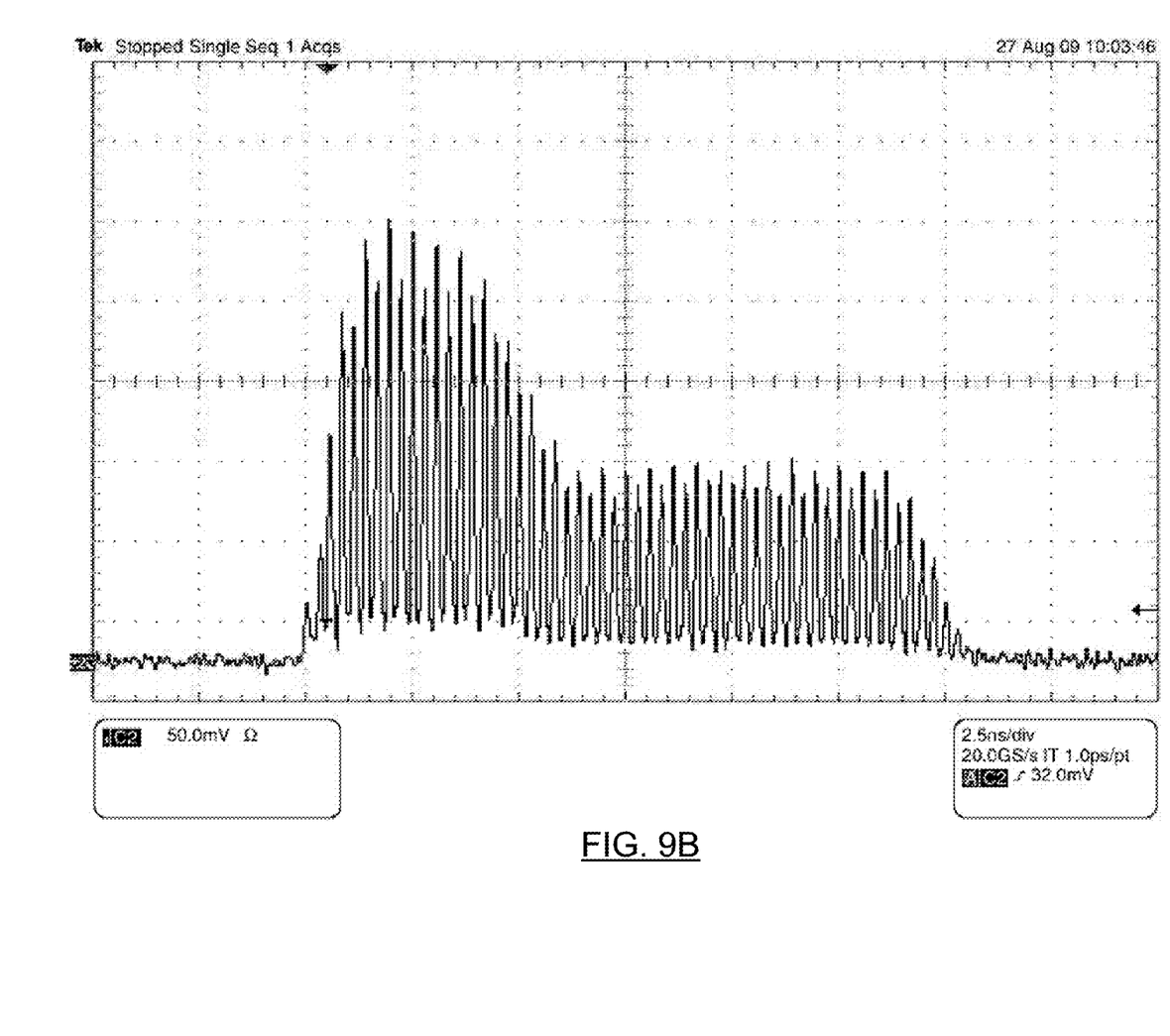

In accordance with another embodiment of the invention, means can also be provided to control and shape the amplitude profile of the seed pulses, thereby shaping the envelope profile of the resulting bursts. Examples of various burst shapes are shown in FIGS. 9A and 9B. The shaping of the amplitude profile of the seed pulses may, for example, be accomplished by varying the pulsed injection current at the seed laser diode in the embodiment of FIG. 4, or by varying the control of the amplitude modulator in the embodiments of FIGS. 5, 6 or the like. Embedded digital pulse shaping electronics as described in U.S. patent application Ser. No. 12/493,949, filed on Jun. 29, 2009 (DELADURANTAYE et al.), the contents of which are incorporated herein by reference in their entirety, may be used for either embodiment. Of course, any other shape control mechanism may be used without departing from the scope of the invention. In variants of this embodiment, successive bursts of picosecond sub-pulses may be given a different envelope profile, providing an even greater agility and versatility to the system.

Of course, as one skilled in the art will readily understand, the device according to embodiments of the invention may further include any appropriate additional component for directing, focussing, amplifying or otherwise acting on light, as may be required by the particularities of a given configuration. For example, amplifiers 68, such as single-mode standard and/or low numerical aperture, large mode area fiber amplifiers doped with rare-earth elements (e.g. Ytterbium or Erbium), may be disposed at various points along the light path, as shown in FIGS. 4 to 6. In a preferred embodiment, the entire device or portions thereof are fiber-based. In the illustrated embodiments of FIGS. 3, 4 and 6, an optical circulator 70 is used to convey the travelling light between the different fiber branches of the device.

Method to Generate Bursts of Sub-Pulses

According to another aspect of the present invention, there is provided a method for generating bursts of picosecond optical sub-pulses.

The method first includes generating seed optical pulses. Each seed optical pulse has a pulse duration, an amplitude profile and a spectral profile as explained above. In one embodiment, the seed pulses are obtained by first generating a continuous wave light beam, and modulating the amplitude of this continuous wave light beam. Alternatively, a seed light source can be electrically modulated. Optionally, the amplitude profile of the seed optical pulses may be modulated to "shape" the envelope of the final burst.

The method next includes imposing a periodic phase modulation on the seed pulses. The periodic phase modulation has a modulation frequency and a modulation amplitude which are jointly selected so that their net effect is to spread the spectral profile of each seed pulse over a plurality of time-dependent spectral components. In one embodiment, the periodic phase modulation is sinusoidal, although other shapes could be considered. The modulation frequency preferably has a value between 100 MHz and 10 GHz, which can be fixed or varied over the pulse duration. The modulation amplitude preferably has a value greater than $\pi$ radians, and can also be fixed or varied over the pulse duration. Both the modulation frequency and modulation amplitude may be changed from one seed pulse to the next, as a function of a desired sub-pulse duration and a desired sub-pulse period.

Finally, the method involves spectrally filtering each seed pulse to retain therein only selected time-dependent spectral components. As explained above, spectral filtering creates gaps in the amplitude profile of the seed pulses, these seed pulses thereby defining bursts of sub-pulses. In a preferred embodiment, the selected time-dependent spectral components are centered on the seed frequency of the seed pulses. Alternatively, the selected spectral components may be centered on another frequency part of the spread spectrum of the seed pulses, or on several such frequencies. In the multi-frequency case, selected time-dependent components may be delayed with respect to each other.

Methods and systems according to embodiments disclosed herein are particularly suited for robust single-transverse mode operation with high spectral purity, two prerequisites for efficient frequency conversion such as second harmonic generation (SHG) and sum-frequency generation (SFG) for extending NIR radiation wavelength to visible and ultraviolet (UV) spectral regions. Visible and UV light in the form of picosecond sub-pulse bursts are as interesting as unconverted NIR, for material processing purposes in various industrial applications. For instance, heterogeneous materials (e.g. multilayered materials such as thin-film photovoltaics) may require varying fluences with machining depth (or layer) because of different ablation threshold. The disclosed embodiments could allow one to devise custom recipes for processing various materials with the same pulsed laser source, thus decreasing the specific cost while increasing processing throughput.

Of course, numerous modifications could be made to the embodiments above without departing from the scope of the present invention as defined in the appended claims.

The invention claimed is:

1. A method for generating bursts of optical sub-pulses, comprising:
    a. generating seed optical pulses each having a pulse duration, an amplitude profile and a spectral profile;
    b. imposing a periodic phase modulation on said seed pulses, said periodic phase modulation having a modulation frequency and a modulation amplitude jointly selected to spread the spectral profile of each of said seed pulses over a plurality of time-dependent spectral components; and
    c. spectrally filtering each of said seed pulses to retain therein only selected ones of said time-dependent spectral components, said filtering creating gaps in the amplitude profile of the seed pulses, said seed pulses thereby defining said bursts of sub-pulses.

2. The method according to claim 1, wherein the generating seed pulses of a. comprises generating a continuous wave light beam and modulating an amplitude of said continuous wave light beam to obtain said seed pulses.

3. The method according to claim 1, wherein the generating seed pulses of a. comprises electrically modulating a seed light source to obtain said seed pulses.

4. The method according to claim 1, wherein the pulse duration of said seed pulses is between 1 ns and 100 ns, and the sub-pulses have a sub-pulse duration between 1 ps and 100 ps.

5. The method according to claim 1, wherein the periodic phase modulation is sinusoidal.

6. The method according to claim 1, wherein the modulation frequency has a value between 100 MHz and 10 GHz.

7. The method according to claim 1, wherein the imposing a periodic phase modulation of b. comprises varying the modulation frequency over said pulse duration.

8. The method according to claim 1, wherein the imposing a periodic phase modulation of b. comprises varying the modulation amplitude over said pulse duration.

9. The method according to claim 1, wherein the imposing a periodic phase modulation of b. comprises varying the modulation frequency and the modulation amplitude as a function of a desired sub-pulse duration and a desired sub-pulse period.

10. The method according to claim 1, wherein the spectral profile of the seed pulses has a seed frequency, and the at least one selected time-dependent spectral components are centered on said seed frequency.

11. The method according to claim 9, wherein the spectral filtering of c. comprises delaying said selected time-dependent components with respect to each other.

12. The method according to claim 1, further comprising varying the amplitude profile of the seed optical pulses over said pulse duration.

13. The method according to claim 1, wherein the imposing a periodic phase modulation of b. comprises activating the phase modulator in synchronization with the seed pulses thereat.

14. A device for generating bursts of optical sub-pulses, comprising:
a light generating assembly generating seed optical pulses each having a pulse duration, an amplitude profile and a spectral profile;
a phase modulator imposing a periodic phase modulation on said seed pulses, said periodic phase modulation having a modulation frequency and a modulation amplitude jointly selected to spread the spectral profile of each of said seed pulses over a plurality of time-dependent spectral components; and
a spectral filtering assembly spectrally filtering each of said seed pulses to retain therein only selected ones of said time-dependent spectral components, said filtering creating gaps in the amplitude profile of the seed pulses, said seed pulses thereby defining said bursts of sub-pulses.

15. The device according to claim 14, wherein the light generating assembly comprises:
a seed assembly outputting the optical pulses; and
a pulse generator cooperating with said seed assembly to control the amplitude profile, pulse duration and repetition rate of said seed pulses.

16. The device according to claim 15, wherein the seed assembly comprises a pulsed seed source electrically driven by said pulse generator.

17. The device according to claim 15, wherein the seed assembly comprises:
a continuous wave seed source generating a continuous light beam; and
an amplitude modulator modulating said continuous light beam to provide said seed pulses, the amplitude modulator being driven by the pulse generator.

18. The device according to claim 14, wherein the phase modulator comprises an acousto-optic component or an electro-optic component.

19. The device according to claim 14, wherein the modulation frequency has a value between 100 MHz and 10 GHz.

20. The device according to claim 14, comprising a phase modulator driver providing a phase modulation drive signal to the phase modulator driving the activation of said phase modulator according to the periodic phase modulation.

21. The device according to claim 20, wherein the phase modulation driver is controllable to vary the modulation frequency over said pulse duration.

22. The device according to claim 20, wherein the phase modulation driver is controllable to vary the modulation amplitude over said pulse duration.

23. The device according to claim 20, wherein the phase modulation driver is controllable to vary the modulation frequency and the modulation amplitude as a function of a desired sub-pulse duration and a desired sub-pulse period.

24. The device according to claim 14, further comprising synchronizing means for activating the phase modulator in synchronization with the seed pulses thereat.

25. The device according to claim 14, wherein the spectral filtering assembly comprises at least one spectrally discriminating element.

26. The device according to claim 14, wherein the spectral filtering assembly comprises at least one Bragg grating.

27. The device according to claim 14, wherein the spectral filtering assembly comprises:
a plurality of Bragg gratings disposed in series each associated with one of said selected time-dependent spectral components; and
at least one delay line, each delay line being disposed between consecutive Bragg gratings of said series.

28. The device according to claim 14, wherein the spectral profile of the seed optical pulses has a seed frequency, and the selected time-dependent spectral components are centered on said seed frequency.

29. The device according to claim 14, wherein the pulse duration of said seed optical pulses is between 1 ns and 100 ns, and the sub-pulses have a sub-pulse duration between 1 ps and 100 ps.

30. The device according to claim 14, further comprising means for varying the amplitude profile of the seed optical pulses over said pulse duration.

* * * * *